Patented Apr. 19, 1938

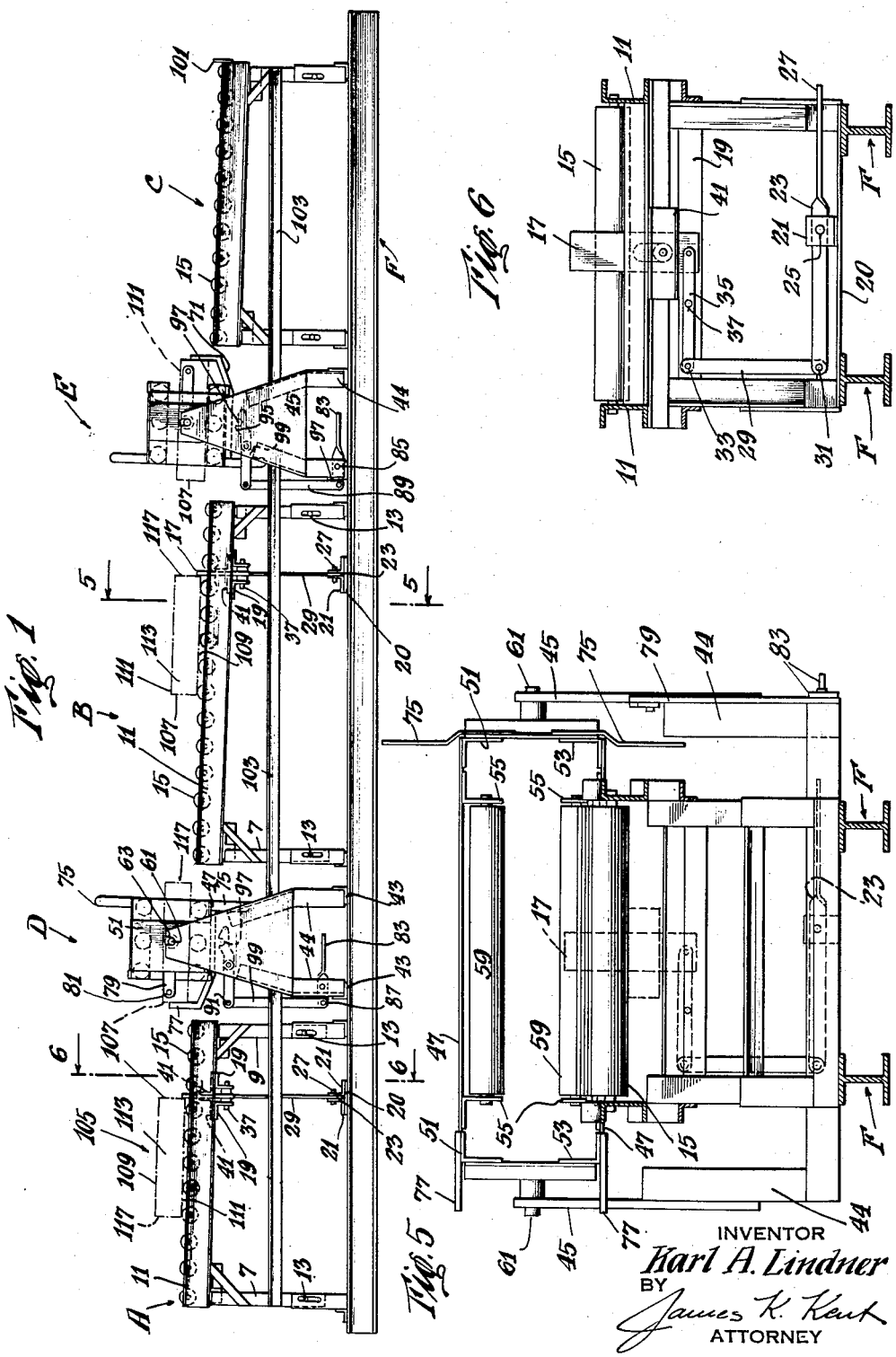

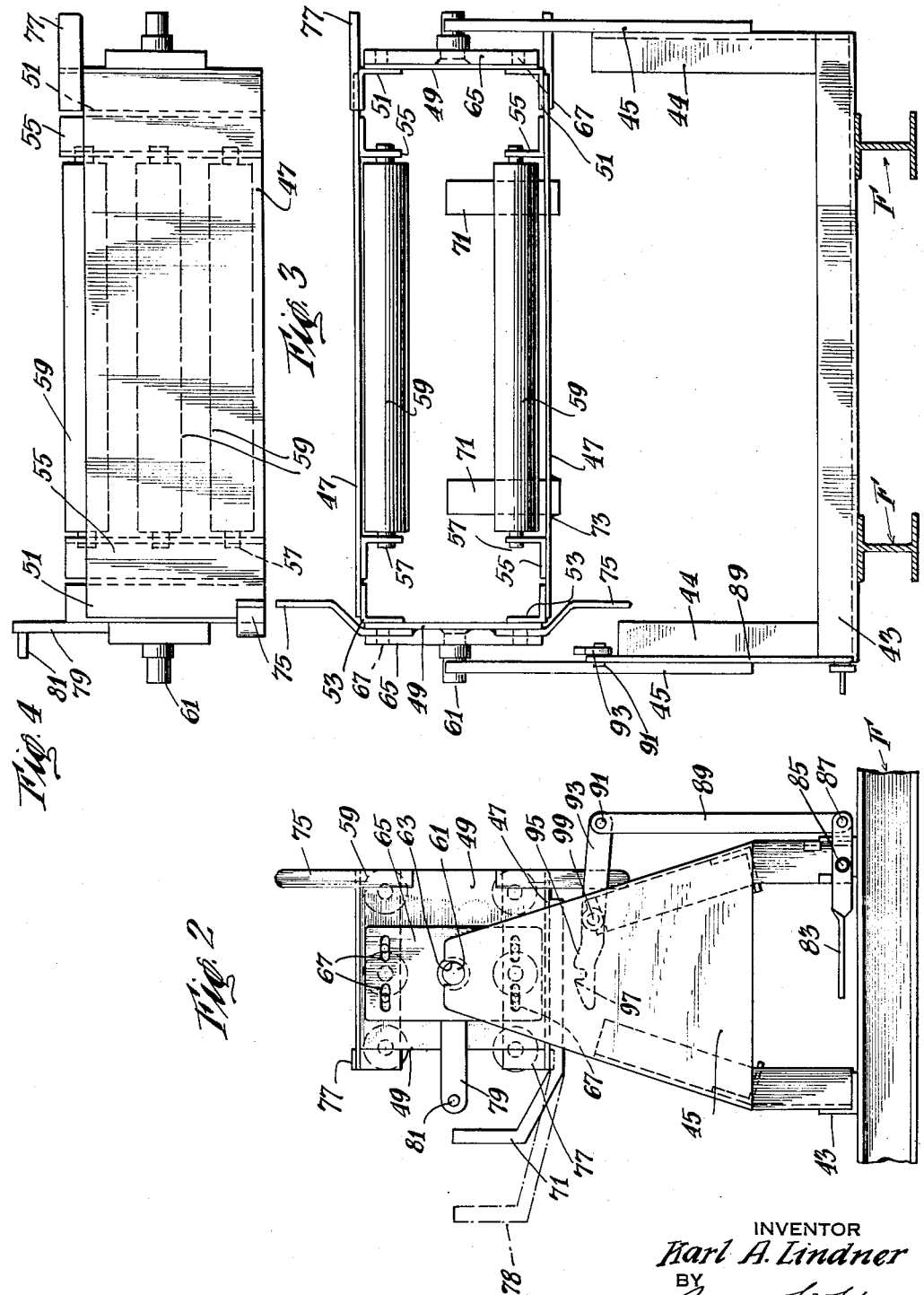

2,114,351

UNITED STATES PATENT OFFICE 2,114,351

MATERIAL HANDLING MECHANISM

Karl A. Lindner, Rahway, N. J., assignor to American Smelting and Refining Company, New York, N. Y., a corporation of New Jersey Application July 16, 1935, Serial No. 31,640

11 Claims. (Cl. 193—43)

In accordance with the present invention, there is provided an improved mechanism by means of which comparatively heavy objects may be thoroughly inspected for visible defects, and conveniently finished or dressed to remove such defects. This apparatus is adapted especially for the inspection of cast metal cakes, although it will be apparent as the description proceeds that its utility is not limited necessarily to such adaption, but may be applied quite generally to the handling of bulky and heavy objects.

However, while this general adaptability of the apparatus will be at once apparent, the description will be given in connection with the specific use of the handling of cast metal cakes.

It is customary, in practice, in casting metal cakes, to pour the metal into vertically disposed molds of generally rectangular configuration, the resulting substantially rectangular and substantially parallel-sided cakes being discharged from the molds when the metal has solidified.

After the cakes have been discharged, it is necessary to carefully inspect all the surfaces thereof, in order to remove the irregularities and imperfections visible thereon.

In order to inspect the cakes completely, it is necessary to examine all of the sides and edges of the cake, and provision must be made to have all of the surfaces of the cake accessible to the dressing tool. This makes necessary a considerable amount of handling or manipulation of the cakes, which, for the most part, is done with the aid of suitable lifting mechanism, such as air lifts, for example. However, in operation a considerable amount of manual handling by an operator is inevitable, and in the turning and manipulation of these heavy cakes, it is not infrequent for an operator to have his fingers crushed or suffer other injuries.

One object of the present invention therefore, is to provide an inspection table which will convey the cakes along the table, and which will enable the cakes to be turned at a plurality of stations along the table without requiring any manual handling of the cakes by an operator thereby eliminating chances of injury.

Other objects of the invention will become apparent as the description proceeds and the features of novelty will be pointed out in particularity in the appended claims.

In general, the invention comprises a conveyor section upon which a cake of metal, or other article, is laid while one face of the cake is being dressed. When this operation is completed, the cake passes into a cage which is turnably mounted on trunnions or the like, by means of which the cake is turned in order to position one side thereof to the dressing tool, and when this operation is completed, a further turning of the cage discharges the cake onto a second conveyor section, but with the opposite face of the cake up, for dressing; from this second conveyor section the cake passes to a second cage, similar to the first, which enables the opposite side of the cake to be brought into dressing position, and further turning of which cage discharges the cake to a third conveyor section which carries the cake to its unloading station.

The invention will be understood more readily by reference to the accompanying drawings, in which Fig. 1 is a side elevation of the complete apparatus.

Fig. 2 is a side elevation of one of the turnably mounted cages.

Fig. 3 is an end elevation of one of the cages turned to horizontal position and looking into the cage, as viewed from the right in Fig. 2.

Fig. 4 is a plan view of the cage of Fig. 3, the supports for the cage being omitted, and the cage being turned in the same position as in Fig. 3.

Fig. 5 is a sectional elevation taken on the line 5—5 of Fig. 1, looking in the direction of the arrows.

Fig. 6 is a sectional view taken on the line 6—6 of Fig. 1, looking in the direction of the arrows.

Referring more particularly to the drawings, A, B, and C represent three successive conveyor sections with cages D and E intermediate thereof, the apparatus being shown as assembled on suitable beams F, F. As will be apparent also from Fig. 1, the entire apparatus slopes from the loading to unloading position, so that the articles being handled will pass along the successive conveyor sections by gravity.

Articles being handled by the apparatus also are shown in Fig. 1, in various stages of transportation along the apparatus, the cage D being shown as being turned in position to discharge one of the articles, such as a cast cake of copper, onto the intermediate conveyor section B, whereas the cage E is in position for receiving a cake from the intermediate conveyor section B.

Each of these conveyor sections comprises supports 7 and 9, positioned beneath each side of the sections, adjacent to the ends thereof. The supports 7, positioned beneath the loading end of the conveyor sections are longer than the supports 9 beneath the discharge ends of the sections, so that the side beams 11 of the conveyor sections which are secured to these supports, will be inclined downwardly towards the discharge end of the section. As will be apparent from Fig. 1, the supports 7 and 9 are composed of vertically adjustable sections connected by suitable bolt and slot connections 13, whereby the inclination of the conveyor section may be adjusted as desired.

Mounted in the side beams 11 are removable rollers 15, these rollers being freely turnable under the weight of the cakes being transported, so that the cakes, or other articles will travel freely along the conveyor.

At a suitable location towards the discharge end of conveyor sections A and B there is positioned a releasable abutment 17, which serves as a stop for the cakes, as will be apparent from Fig. 1.

This abutment is retractible by lever mechanism shown, for example, in Fig. 6. Extending from one to the other of the side beams or channels 11, and welded to the underside thereof, are angles 19, 19. A plate 20 extends across the bottom channels F, F and is welded to these channels, this plate being positioned below the angles 19, 19. To the plate 20 are welded the angles 21, 21, which are spaced apart sufficiently to admit a lever 23 between them, this lever being fulcrumed on a fulcrum-pin or rod 25 which is passed through the angles 21, 21 and suitably secured against displacement. The lever 23 has a portion 27 thereof formed into a pedal for operation by a foot of an operator, this pedal portion extending for a convenient length from one end of the lever. The lever 23 is mounted substantially horizontally, and the pedal portion 27 is depressed when pressure is exerted thereon by the operator.

To the other end of the lever 23 is secured an arm 29, the connection between the lever 23 and arm 29 being indicated at 33. The arm 29 extends vertically to between the angles 19, and at its upper end it is connected at 33 to a lever 35, this lever 35 extending in the same direction as the lever 23, and is fulcrumed at 37 to the angles 19. The lever 35 is connected at 39 to the abutment 17; so that when the pedal 27 is depressed, the abutment 17 will be retracted to below the level of the conveyor rolls 15, thereby clearing the way for a cake to enter a cage D or E, which will be described next. It may be noted, however, that it may be desirable to provide guide angles 41, 41 for the abutments 17, these angles being welded to the angles 19, 19.

Each of the cage structures D, E, are alike, so that only one needs to be described in detail. As will be apparent, each of these cages is positioned between adjacent conveyor sections, and each is adapted to receive a cast cake of metal, or other article, from one conveyor section and to discharge the said cake, on the reverse side, onto the succeeding conveyor section.

Across the base channels F, F are welded angles 43, 43, to which angles are welded angles 44, 44 which form legs for the cage supports, which include corresponding plates 45, 45, welded to the angles 44, 44, the cages being turnably mounted on these plates.

Each cage comprises side plates 47, 47 and end plates 49, 49, the cage being completed by end angles 51, 51, and 53, 53 to which the said side and end plates are welded. To the side plates 47, 47 are welded also angles 55, 55, 55, 55, the flanges of which angles are directed inwardly of the cage from these plates, and which serve as mountings for the stationary axles 57 of the rollers 59. In the illustrated form of the apparatus, three rollers 59 are illustrated adjacent to each of the plates 47 and the space between the rollers is sufficient to freely admit a standard size of cast copper cake.

The cage is turnably mounted on trunnions 61, 61, which rest in recesses 63, in the upper end of the supports 45. Each of the trunnions 61 is integral with a plate 65 having slots 67, 67, lugs 69, 69 from the end plates 49, 49 extending into these slots so that the cage can be adjusted relatively to the trunnions until it is in equilibrium relative to the trunnions, so that a negligible amount of effort will be required by an operator to turn a cage with a cake therein. When the proper adjustment of the cage relative to the trunnions has been obtained, the adjustment is made permanent by welding the plates 49 and 65 together.

In order to prevent a cake from sliding completely through the cage, stop brackets 71 are provided which form abutments or stops for the cakes when the latter pass into the cage, and supports for the cakes when the cages are in upright position for inspecting the edge surface of the cakes. These brackets 71 are bolted to one of the plates 47, as indicated at 73, so that they may be removed and replaced with other brackets such as 78 of a different length when the size of the cakes being handled is changed.

In order to turn the cage, handles 75, 75 may be provided, and for preventing the cage from turning completely around, outwardly projecting stops 77, 77 are welded to the plates 47, 47, which stops 77 abut against the edges of the plates 45 when the cage is turned into horizontal position.

It is desirable to lock the cages in upright position during inspection of the side of the cake. For this purpose, each cage is provided with an arm 79 extending from the bottom of the cage when the cage is in upright position, and on this arm is an outwardly projecting lug 81, which is adapted to lock with a lever mechanism now to be described.

This lever mechanism comprises a pedal lever 83 which is fulcrumed on a rod 85 secured in opposing flanges of the angles 44. The end of the pedal lever 83 is connected at 87 to an arm 89, which in turn is connected at 91 to a lever 93, which is provided with a cam surface 95, and a recess or notch 97 in which the lug 81 on the arm 79 is received for locking the cage in upright position. As the cage is turned into upright position, the lug 81 rides on the cam surface 95, depressing the lever 93 until the lug 81 reaches the recess 97, and when the pressure on the lever 93 is momentarily released, the action of arm 89 on the levers 93 and 83 moves these levers so that the recess 97 assumes locking position with the lug 81. The lever 93 is fulcrumed, as indicated, at 99, to plates 45. Therefore, when the pedal 83 is depressed, the lever 93 is moved so as to drop the recess 97 out of engagement with the lug 81, and thus release the cage for turning. Upon release of pressure from the pedal 83, the pedal and lever system just described moves automatically into its previous normal position; and this is true also of the pedal 27 and its associated lever mechanism.

At the discharge end of the final conveyor section C there is an abutment 101 for preventing the cakes from dropping off from the conveyor, and along each side of the apparatus is a reinforcing angle beam 103, each of which extends the entire length of the apparatus.

It will be recalled that in the usual practice of vertically casting copper cakes, the molten copper is poured into a mold having a cavity substantially rectangular in cross section and with its longest dimension vertically disposed, i. e., constituting the depth of the cavity. The mold itself may be either a one-piece mold or a two-piece mold, and the walls and bottom of the mold cavity are coated with a suitable mold wash or dressing before the molten copper is poured into the mold, which prevents the copper cast into the mold from sticking in the mold. When the molten copper is poured, the upper surface of the resulting cake is exposed to the air and becomes oxidized during solidification of the cake, forming a so-called "set" surface. The remaining surfaces of the cake, although unoxidized, may, and frequently do, have irregularities of various kinds on them, and these irregularities must be removed before the cakes are sent to the rolling mill, as all imperfections in the cake will remain as defects through all the working operations through which the copper may be put, and a close inspection of the individual cakes and removal of these imperfections are necessitated before shipment of the cake.

The surface irregularities are usually removed by dressing the cakes manually, using a pneumatic chipping machine, which chips off these irregularities, and this operation requires a convenient table for the operators to inspect and to dress the cakes. The cakes are of standard dimensions and weights, e. g., 600 lbs. and 800 lbs., usually, and for the inspection and chipping operations, they must be turned so that the various surfaces are brought into accessibility for the operator. This is done usually, by pneumatc lifting devices, but, as aforesaid, a considerable amount of manual handling of the cakes is virtually inevitable, with consequent likelihood of injury to the hands of an operator. The present invention avoids all manual handling of the cakes, and at the same time presents, successively, the various surfaces of the cake for inspection and dressing.

In Fig. 1, the reference numeral 105 indicates a vertically cast cake of copper in position on the receiving end of the improved inspection table. The cake has been placed on the table with its long axis transversely across the table and with the set end 113 of the cake substantially parallel to the direction of travel of the cake. While this set surface is required to be removed before rolling the cake, this is done subsequently to the dressing of the cake for removal of surface imperfections.

For convenience of reference, the remaining surfaces of the cake are indicated by numerals 109 and 111 for the faces of the cake and 107 and 117 for the side surfaces.

Not all positions of the cake are shown on the drawings, but the manipulations will be understood as the description of the operation proceeds.

As has been pointed out previously in this description, the inspection table slopes downwardly and uniformly toward the discharge end so that the cakes will pass by gravity along the rollers 15. In practice a slope of one-fourth inch per foot of length has been found to be sufficient.

The cake 105, positioned as above described on the conveyor section A, is conveyed by gravity along the rollers 15 until it hits the abutment 17, which holds the cake so that the face 109 may be inspected and dressed. The cage D is turned manually, by an operator grasping handles 75, through 180° from its position shown in Fig. 1, so that the cake 105 may enter the cage upon release of the abutment 17 by an operator pressing upon the pedal 27. When this is done, the cake passes into the cage until the side 107 hits the stops 71. The cage is then turned through 90° until the lug 81 engages the notch 97 in the lever 93, which locks the cage in upright position with the side 117 of the cake at the top and in position for convenient inspection and dressing.

When pedal 83 is depressed, the lever 93 is depressed and the lug 81 is released from the notch 97, so that the cage D may then be turned through a further 90° arc into the position shown in Fig. 1, so as to discharge the cake onto the conveyor section B. The cake then will have been turned vertically and laterally through 180°, so that now the opposite face 111 will be uppermost and in position for inspection and dressing, the cake then passing along the conveyor section B, as described above, until stopped by the abutment 17.

When the dressing of the side 111 has been completed, the abutment 17 is depressed by depressing the pedal 23, and the cake is passed into the cage E, which is then turned into upright locking position as described previously in connection with the cage D, but this time the side 107 of the cake will be upright, and presented for inspection and dressing. Depression of lever 83 releases the cage E for further rotation into position to discharge the cake onto the conveyor section E, where it travels until it reaches the stop 101. The cake has now been turned completely through 360°, and all surfaces have been presented for inspection and without the necessity of the cake being touched by the operator. Very little effort is required to turn the cages, as they are so adjusted as to be substantially exactly balanced on their trunnions.

If it should be desired to operate on cakes of different sizes, all that is necessary is to replace stop brackets 71 with the longer brackets 78 which have been designed for use with the larger cake, removing, if necessary, as many of the rollers 15 on the conveyor sections as may be required for clearance of the longer brackets 78.

What is claimed is:

1. Apparatus for expediting inspection of cast metal cakes or other articles, comprising the combination with a supporting frame, of a receptacle turnably mounted on the frame on a horizontal axis from a material receiving position to a material discharging position, mechanism for releasably locking the receptacle in an intermediate inspection position, the said mechanism comprising a locking lever, a lever for releasing the locking lever, a link connecting the said levers, and means carried by the receptacle adapted to interlock with the locking lever, the said locking lever being automatically positioned in locking position when the releasing lever is inactive.

2. Apparatus for expediting inspection of cast metal cakes or other articles, comprising the combination with a supporting frame, of a receptacle turnably mounted on the frame on a horizontal axis from a material receiving position to a material discharging position, and mechanism for releasably locking the receptacle in an intermediate inspection position, the said mechanism comprising a releasable locking lever having a cam surface provided with a locking notch, a lever for releasing the locking lever, a link connecting the said levers, and a stud carried by the receptacle for engaging with the said notch for automatically locking therewith as the stud comes into engagement therewith, the said locking lever being automatically positioned in locking position when the releasing lever is inactive.

3. An inspection table for eliminating manual handling of cast copper cakes, comprising, in combination, a series of successive conveyor sections along which the cakes are adapted to travel by gravity, receivers for the cakes intermediate the conveyor sections, the said receivers comprising cages turnable about a horizontal axis for receiving the cakes from one conveyor section and for discharging the cakes on the succeeding conveyor section, each of the said cages being adapted to turn the cake through an arc of at least 180°, thereby enabling ready inspection of the cakes on all surfaces thereof without requiring manual handling of the cakes, means for turning the said cages, and locking mechanism for releasably holding the said cages in an inspection position intermediate the receiving and discharging positions of the cages.

4. An inspection table for eliminating manual handling of cast copper cakes comprising, in combination, a series of successive conveyor sections along which the cakes are adapted to travel by gravity, receivers for the cakes intermediate the conveyor sections, the said receivers comprising cages turnably mounted about a horizontal axis, guide rolls in the cages adapted to be engaged by the cake in the cages for guiding the cakes into and out of the cages, the said cages being turnable into cake-receiving position and cake-discharging position for discharging the cakes on to the succeeding conveyor section, the said cages successively being adapted to turn the cakes through successive arcs of at least 180°, thereby enabling ready inspection of the cakes on all surfaces thereof without requiring manual handling of the cakes, means on the cages for retaining the cakes therein during receiving and turning operations, and locking mechanism for releasably holding the said cages in an inspection position intermediate the receiving and discharging positions of the cages.

5. An inspection table for eliminating manual handling of cast copper cakes, comprising, in combination, a series of successive conveyor sections along which the cakes are adapted to travel by gravity, receivers for the cakes intermediate the conveyor sections, the said receivers comprising cages turnably mounted about a horizontal axis for receiving the cakes from one conveyor section and for gravitationally discharging the cakes on the succeeding conveyor section, each of the said cages being adapted to turn the cake through an arc of at least 180°, thereby enabling ready inspection of the cakes on all surfaces thereof without requiring manual handling of the cakes, means for turning the said cages, locking instrumentalities for releasably holding the said cages in an inspection position intermediate the receiving and discharging positions of the cages, stop devices on the conveyor sections for interrupting passage of the cakes to the cages and for restraining movement of the cakes along the conveyor to allow for inspection thereof, and instrumentalities for withdrawing the said stop devices from the path of travel of the cakes, the said devices being automatically maintained normally in stopping position.

6. An inspection table for eliminating manual handling of copper cakes during inspection thereof, comprising, in combination a series of successive spaced conveyor sections having a substantially uniform slope from the receiving end to the discharge end thereof whereby the cakes may slide by gravity along the conveyor, devices intermediate the conveyor sections forming receivers for the successive cakes, the said devices comprising open ended receptacles into which the cakes are adapted to slide and provided with upper and lower sets of conveyor rollers adapted to engage opposite faces of the cake as the cake moves into the receptacle, abutment members for the cakes on the receptacles for retaining the cakes in the receptacles, mounting means for the receptacles, trunnions for turnably mounting the receptacles on the supporting means, the said trunnions being positioned on an axis passing substantially through the center of gravity of the receptacles with a cake therein thereby substantially equally balancing the receptacle and cake about the trunnions for facilitating turning thereof, the said rollers in the receivers being sloped relatively to each other for enabling the cakes to slide freely into the receiver and then out therefrom when the receiver has been turned to the opposite position, the said rollers being also positioned relatively to the adjacent conveyor section so that the cake will freely pass from the receiver onto the adjacent conveyor section, and means for releasably locking the receiver in predetermined positions in its arc of rotation for enabling inspection of the ends of the cake.

7. An inspection table comprising, in combination, a conveyor comprising a supporting frame, conveying rollers mounted on the frame along which rollers articles to be inspected are adapted to pass, a releasable stop for halting passage of the articles along the said rollers, a turnable receiver adapted to directly receive the said articles, instrumentalities for turning the receiver, mechanism for releasably locking the receiver in a selected position for enabling inspection of any portion of the articles in the receiver, the said receiver comprising a supporting frame, a cage having substantially open sides and open ends and provided with trunnions for turnably supporting the cage on the frame, and retaining means on the cage for retaining the articles in the cage during turning thereof into inspecting position while enabling free release of the articles upon further turning of the cage into discharging position, the said cage being in substantial balance on the trunnions.

8. An inspection table comprising the combination with a plurality of separate conveyor sections for conveying articles to be inspected, of a receiver positioned between successive conveyor sections and adapted to receive the articles from one of the sections and to discharge the articles onto the succeeding section, the said receiver comprising a turnably mounted receptacle allowing over-all inspection of the article therein, supports for the receptacle, locking means for locking the receptacle in a selected position, turning devices for the receptacle enabling the receptacle to be turned to receive the articles from one conveyor section and to discharge by gravity the said articles onto the succeeding conveyor section, the locking means being adapted to hold the receptacle in a selected position intermediate the receiving and discharging positions for inspection of the articles therein, and mechanism for releasing the locking means upon completion of the inspection of the said articles thereby enabling the said receptacle to be continued to be turned into discharging position.

9. An inspection table for copper cakes, comprising, in combination, a plurality of aligned conveyor sections along which the cakes are adapted to move, receivers for the cakes intermediate adjacent conveyor sections, the receivers comprising cages into which the cakes are adapted to pass for inspection, the said cages conforming interiorly to the approximate configuration of the cakes and defining an open frame permitting access to the ends and sides of the cakes for inspection and chipping thereof while the cakes are within the cages, instrumentalities for rotating the cages from an approximately horizontal cake-receiving position to an approximately horizontal cake-discharging position, and means for releasably securing the cage intermediately of the receiving position and the discharging position to enable over-all inspection of the cake.

10. An inspection table for copper cakes, comprising, in combination, a plurality of aligned conveyor sections along which the cakes are adapted to move, receivers for the cakes intermediate adjacent conveyor sections, the receivers comprising cages into which the cakes are adapted to pass for inspection, the said cages conforming interiorly to the approximate configuration of the cakes and having open ends through which the cake may pass, retaining means adjacent to one of the ends to prevent the cake from passing wholly through the cage, the said retaining means comprising removable brackets provided with abutments for restraining the cakes, the said brackets being demountable and replaceable with brackets of another size for enabling the same receivers to be used for cakes of different sizes, instrumentalities for turning the cages from an approximately horizontal receiving position to an approximately horizontal discharging position for transferring the inspected cake from the cage to the adjacent conveyor section and means for holding the cages in selected inspection positions intermediate the receiving and discharging positions.

11. An inspection table for copper cakes, comprising, in combination, a plurality of aligned conveyor sections along which the cakes are adapted to move, receivers for the cakes intermediate adjacent conveyor sections, the receivers comprising cages turnably mounted on a horizontal axis and adapted to receive the said cakes directly from one of the conveyor sections and to discharge the cakes directly upon the adjacent conveyor section, instrumentalities for turning the receiver from a substantially horizontal receiving position to a substantially horizontal discharging position, mechanism for releasably locking the cages in a selected inspecting position for enabling an over-all inspection of the cakes, a supporting frame for each of the said cages, trunnions for the cages for turnably supporting the same on the frames, and retaining means on the cage for retaining the cakes in the cage during turning thereof into inspecting position while enabling free release of the cakes from the cage upon further turning of the cage into discharging position.

KARL A. LINDNER.